(12) United States Patent
Curet

(10) Patent No.: US 9,540,456 B2
(45) Date of Patent: Jan. 10, 2017

(54) COMPOSITION FOR A STRUCTURAL ADHESIVE

(75) Inventor: Arnaud Curet, Senlis (FR)

(73) Assignee: JACRET, Le Thillary (FR)

( * ) Notice: Subject to any disclaimer, the term of this patent is extended or adjusted under 35 U.S.C. 154(b) by 525 days.

(21) Appl. No.: 13/496,421

(22) PCT Filed: Sep. 15, 2010

(86) PCT No.: PCT/EP2010/063580
§ 371 (c)(1),
(2), (4) Date: May 25, 2012

(87) PCT Pub. No.: WO2011/033002
PCT Pub. Date: Mar. 24, 2011

(65) Prior Publication Data
US 2012/0252978 A1    Oct. 4, 2012

(30) Foreign Application Priority Data
Sep. 16, 2009   (FR) .................................... 09 04428

(51) Int. Cl.
| C08F 4/32 | (2006.01) |
| C08F 4/72 | (2006.01) |
| C09J 4/06 | (2006.01) |
| C09J 133/12 | (2006.01) |
| C09J 163/00 | (2006.01) |
| C09J 133/10 | (2006.01) |
| C08K 5/14 | (2006.01) |
| C08K 5/5435 | (2006.01) |
| C08L 33/10 | (2006.01) |
| C08L 33/20 | (2006.01) |
| C08L 35/06 | (2006.01) |

(52) U.S. Cl.
CPC .. C08F 4/32 (2013.01); C09J 4/06 (2013.01); C09J 133/12 (2013.01); C09J 163/00 (2013.01); C08K 5/14 (2013.01); C08K 5/5435 (2013.01); C08L 33/10 (2013.01); C08L 33/20 (2013.01); C08L 35/06 (2013.01)

(58) Field of Classification Search
CPC ........................................................ C08F 4/32
USPC ........... 502/160, 158; 528/393; 525/93, 228; 526/194
See application file for complete search history.

(56) References Cited

U.S. PATENT DOCUMENTS

| 3,838,093 A | 9/1974 | Owston |
| 3,985,703 A | 10/1976 | Ferry et al. |
| 4,304,709 A | 12/1981 | Salee |
| 6,433,091 B1 | 8/2002 | Cheng |
| 6,869,497 B2 | 3/2005 | Doe et al. |
| 2007/0187034 A1 | 8/2007 | Dux et al. |
| 2010/0084092 A1 | 4/2010 | Curet et al. |
| 2010/0116435 A1 | 5/2010 | Curet et al. |

FOREIGN PATENT DOCUMENTS

| EP | 0930322 A2 | 7/1999 |
| EP | 1256615 A2 | 11/2002 |
| EP | 1932882 A1 | 6/2008 |
| WO | WO-02051899 A2 | 7/2002 |
| WO | WO-03040248 A2 | 5/2003 |
| WO | WO-03097756 A1 | 11/2003 |
| WO | WO-2008080913 A1 | 7/2008 |
| WO | WO-2008125521 A1 | 10/2008 |

*Primary Examiner* — Duc Truong
(74) *Attorney, Agent, or Firm* — Polsinelli PC

(57) ABSTRACT

The present invention relates to a polymerization-initiating agent for acrylic adhesives containing an epoxidized silane.

26 Claims, No Drawings

COMPOSITION FOR A STRUCTURAL ADHESIVE

RELATED APPLICATIONS

This application is a national stage application (under 35 U.S.C. §371) of PCT/EP2010/063580, filed Sep. 15, 2010, which claims priority of French application 0904428 filed on Sep. 16, 2009.

The present invention relates to the field of structural adhesives, in particular acrylic structural adhesives (based on acrylates or on methacrylates), and to their applications.

Structural adhesives are a good alternative to the other mechanical techniques for bonding together two materials, such as metals or plastics. This is because the force distribution is better by adhesive bonding than when alternative techniques, such as riveting or welding, are used. Furthermore, the use of adhesive bonding often makes it possible to operate faster and also exhibits the advantage of providing better insulation against external elements (dust, moisture) than mechanical technologies.

Structural adhesives are thus used in many industrial fields, including for the adhesive bonding of composites.

Structural adhesives are composed of two elements, namely a catalyzing element which is used to carry out the polymerization of the other element, a resin which comprises monomers. There thus exists three types of two-component adhesives (epoxy, polyurethanes and acrylics), according to the nature of the monomer present in the resin.

Acrylic adhesives are particularly advantageous, in particular in terms of polymerization profile and of possibility of being used on surfaces not prepared beforehand.

However, the results of the adhesive bonding of composite materials with these adhesives may prove to exhibit performances inferior to those obtained with epoxide adhesives, in particular for the composites manufactured in closed molds. Mention may thus be made of RTMs (Resin Transfer Molded), SMC (Sheet Molded Compounds, prepregs based on sheets) or pultrudates (polyester/glass fiber composites).

RTM composites are obtained by a process of molding by injection of polyester resin onto a mat of glass fibers, being a hermetically closed mold. Vacuum is applied in order to allow the resin to flow better and thus to suppress defects, such as bubbles or gaps.

Some solutions have been provided for improving the adhesive bonding properties of acrylic adhesives ((meth) acrylate-based adhesives). Mention may thus be made of the stages for the preparation of surfaces, such as described in U.S. Pat. No. 3,838,093. Thus, it may prove to be necessary to abrade and then to degrease, with isopropyl alcohol, the surface of some RTMs in order to remove possible agents capable of causing major attachment defects by migration to the surface.

Mention may also be made of the teaching of WO 03/040248, which gives a very sound restatement of the difficulties in producing adhesion of (meth)acrylate-based adhesives to composites such as RTMs, in particular due to the presence of plasticizing agents (such as dibutyl and/or diisobutyl and/or dibenzyl phthalate) in the catalytic composition (comprising the polymerization initiators). The plasticizing agents may thus migrate into the material to be adhesively bonded or may extract certain compounds therefrom, such as inhibitors or mold-release agents, which penetrate into the adhesive interface. The adhesiveness may thus be greatly reduced.

WO 03/040248 proposes to solve this problem by the formulation of a specific (meth)acrylate resin.

Patent applications WO 2008/080913 and WO 2008/125521 also provide for the addition of components to the (meth)acrylate resins, making it possible to obtain better adhesion to the composites.

The Applicant has now developed a formulation of the catalyzing agent which makes it possible to substantially improve the mechanical performance of (meth)acrylate adhesives on composite substrates. The shear strength is thus improved for adhesion to a composite and in particular to all the composites manufactured in closed molds.

The problem of adhesive bonding on a composite is that of not obtaining adhesive failure in the event of mechanical stress. It thus instead relates to obtaining at least failure of one of the two parts.

The properties of the adhesive for this tensile shear strength can be determined by a test based on standard ISO 4587, using two RTM test specimens. The aim is to find a tensile shear strength of greater than 2 MPa, preferably of greater than 2.5 MPa and more preferably of greater than 3 MPa, on the basis of this test.

In fact, adhesive failure reveals an attachment defect of the structural adhesive on the RTM which risks initiating detachments brought about by infiltration of water, heat shocks, vibrations, and the like. Numerous motor vehicle body work parts are made as RTM and have to be structurally bonded adhesively without any attachment defect.

This catalyzing agent comprises free-radical polymerization initiators and is added to the resin comprising the monomer agents in order to initiate the polymerization thereof, thus providing the cohesive joining of two materials.

The invention thus relates to a composition which can be used in a structural adhesive, comprising a free radical polymerization initiator and an epoxidized silane.

Epoxidized silanes are well known in the art. Application WO 02/051899 thus cites a list of epoxidized silanes. Use may thus be made, in the context of the composition according to the invention, of an epoxidized silane chosen from β-(3,4-epoxycyclohexyl)ethyltrimethoxysilane, β-(3,4-epoxycyclohexyl)-ethyltriethoxysilane, γ-glycidoxypropyltrimethoxysilane, γ-glycidoxypropylmethyldimethoxysilane, γ-glycidoxypropylmethyldiethoxysilane, γ-glycidoxypropylmethyltriethoxysilane, 3-glycidyloxypropyltriethoxysilane (GLYEO) and 3-glycidyloxypropyltrimethoxysilane (GLYMO).

β-(3,4-Epoxycyclohexyl)ethyltriethoxysilane, sold in particular under the name Coatosil 1770 (Momentive Performance Materials, Wilton, Conn., United States), is particularly suitable for use in a composition according to the invention.

Use may also be made of functional epoxysilane oligomers, such as CoatOsil MP 200 cross linker (Momentive Performance Materials).

The epoxidized silane is generally between 1 and 30%, preferably between 5 and 20% (by weight) of the composition.

The use of an epoxidized silane (epoxysilane) in a composition according so the present invention makes it possible to significantly reduce the presence of plasticizing agents in the composition.

In fact, it is possible to thus obtain compositions comprising less than 20% of plasticizing agent. In some embodiments, the compositions according to the invention comprise less than 15%, indeed even less than 12% or less than 10% (by weight) of a plasticizing agent. The term "less than xxx %" is understood as comprising the upper limit, and signifying containing "at most xxx %".

The free radical polymerization initiator is well known to a person skilled in the art. Thus, it is an oxidizing agent which reacts with the reducing compounds (amines) present in the resin. This agent can thus be a peroxide, such as benzoyl peroxide and any other diacyl peroxide, a hydroperoxide, such as cumene hydroperoxide, a perester, such as P-butyl peroxybenzoate or tert-butyl peroxybenzoate, or a ketone hydroperoxide, such as methyl ethyl ketone hydroperoxide. It can also be an organic transition metal salt, such as cobalt naphthenate, or a compound comprising labile chlorine, such as sulfonyl chloride.

Usually, the composition comprises between 0.5 and 50% (by weight) of this polymerization initiating agent, or preferably between 5 and 40% by weight and most preferably between 10 and 20% by weight. In a preferred embodiment, the composition comprises approximately 20% by weight of the polymerization initiating agent. The preferred agent is benzoyl peroxide. If it is desired to slow down the polymerization rate in order to increase the duration of application of the adhesive, use may be made of the order of 10% by weight of polymerization initiating agent. The composition according to the invention can also comprise fillers, in particular inorganic fillers, such as silica, calcium carbonate or titanium oxide.

It can also comprise stabilizing agents, thickening agents, defoamers or coloring agents.

In a particular embodiment, the composition additionally comprises an epoxide resin (or epoxide resin). Such agents are described in the art, in particular in WO 2003/097756. This epoxide resin is present in an amount of between 10 and 60% (by weight) in the composition, preferably between 15 and 45% and more preferably between 20 and 30%.

The term "epoxide resin" covers a large number of compounds, in particular octadecylene oxide, glycidyl methacrylate, bisphenol A diglycidyl ether, vinylcyclohexene dioxide, 3,4-epoxycyclohexylmethyl 3,4-epoxycyclohexanecarboxylate, epoxy cresol novolacs, epoxy phenol novolacs, or epoxide resins based on bisphenol A. Other compounds which can be used in the composition of the invention are mentioned in WO 2003/097756.

It is preferable to use liquid epoxide resins based on bisphenol A, which are relatively inexpensive, in particular bisphenol A diglycidyl ether.

The composition according to the invention is used to induce the polymerization of a (meth)acrylic resin, that is to say a resin based on acrylate or methacrylate monomers (which can be obtained by esterification of an alcohol and of methacrylic or acrylic acid). The composition according to the invention is generally used in a ratio (by volume) of 1:1 to 1:30, preferably of 1:5 to 1:30, more preferably still approximately 1:10, with respect to said resin (1 part of the composition according to the invention is mixed with 10 parts of the resin).

In a preferred embodiment, use is made of cartridges comprising a compartment containing the polymerizable resin and another compartment containing the composition according to the invention. The two parts are mixed at the time of use, in order to initiate the polymerization. This mixture is thus produced via a static mixer in the nozzle. This system makes it possible to meter out the amount of adhesive during application, which is advantageous for large scale applications. Thus, after mixing the two products, one or both surfaces to be assembled are coated with the adhesive system, and the surfaces are placed in contact with one another.

Such a system for the presentation and use of (meth) acrylic adhesives is well known in the art. It is described in particular in WO 03/097756 (which refers to component B for the compositions having the same role of polymerization initiation as the composition according to the invention and to component. A for the (meth)acrylic resins).

The resin thus comprises (meth)acrylic monomers. In a preferred embodiment, it is a methacrylate monomer. Preferably, a methacrylate monomer is chosen in which the alcohol part exhibits a short linear chain (that is to say, a chain having one or two carbon atoms). Thus, the preferred monomers are methyl methacrylate and ethyl methacrylate.

In another embodiment, the alcohol part exhibits at least one ring, which may or may not be substituted. Thus, in this embodiment, the monomers can be chosen in particular from tetrahydrofurfuryl methacrylate, phenoxyethyl methacrylate, isobornyl methacrylate, glycidyl ether methacrylate, benzyl methacrylate, cyclohexyl methacrylate or trimethylcyclohexyl methacrylate.

Mixtures of these esters can also be used. The percentage by weight of (meth)acrylate monomer in the resin is preferably between 20 and 80%, more preferably between 30 and 65%, more preferably still from 42 to 58%, i.e. approximately in the vicinity of 50%.

In a specific embodiment, the resin also comprises at least one acrylate ester monomer in which the alcohol part exhibits a linear chain of at least 6 carbon atoms (long-chain). Thus, use is preferably made of lauryl methacrylate, 2-ethylhexyl methacrylate, 2-ethylhexyl acrylate, esters based on polyethylene glycol, or mixtures of these esters. It is preferable for the resin to comprise at most 10%, more preferably at most 8%, indeed even at most 5%, by weight, in total of these long-chain acrylic monomers. In a specific embodiment, the resin comprises a mixture of two long-chain acrylic ester monomers. Preferably, when the resin comprises only a single acrylic ester monomer, it is preferable for it to be present in an amount of less than or equal to 8% by weight, whereas it is acceptable for there to be an amount thereof of between 8 and 10% when the resin comprises a mixture of these esters. In this case, it is preferable for each to be present at 5% at most.

The resin can also comprise other monomers, such as acrylonitrile, methacrylonitrile or styrene.

The resin can also comprise an elastomeric block copolymer comprising styrene (in particular an elastomeric block copolymer comprising styrene and isoprene or an elastomeric block copolymer comprising styrene and butadiene or ethylene) or a blend of different block copolymers.

Thus, it can comprise a styrene/isoprene/styrene (SIS) block copolymer, a styrene/butadiene/styrene (SBS) copolymer, a styrene/isoprene/butadiene/styrene (SIBS) copolymer or a styrene/ethylene/butylene/styrene (SEBS) copolymer. It can also comprise blends of these compounds and in particular SIS/SBS, SIS/SIBS and SIS/SBS/SIBS blends.

Preferably, the composition according to the invention comprises between 5 and 30% by weight, preferably between 12 and 25% by weight and more preferably between 15 and 25% by weight of the elastomeric block copolymer(s).

The resin can also comprise an elastomer. If need be, it is functionalized (exhibiting a double bond at its ends, in particular methacrylate functional groups, for improving the bondings with the monomers). In some cases, a liquid elastomer is chosen. Use is preferably made of at least one functionalized elastomer, alone or as a mixture with at least one nonfunctionalized elastomer.

When the resin comprises one or more elastomeric block copolymers (see below), the elastomer is chosen so that it is compatible in solution with the block copolymers used. In particular, it is chosen so that its Hildebrand solubility parameter is compatible with the Hildebrand solubility parameters of the block copolymers used in particular, it is chosen so that its value does not differ by more than 10% from the mean of the values, of the Hildebrand solubility parameters of the block copolymers used. The Hildebrand solubility parameter is well known and is calculated by the square root of the cohesive energy density of the compound. The Hildebrand solubility parameter is directly related to the dispersion forces (Van der Waals' forces) which are exerted between the molecules of a chemical substance. Thus, use is preferably made of elastomers of polybutadiene homopolymer (which is then chosen preferably liquid and functionalized), polyisoprene homopolymer or polychloroprene homopolymer type. Use may also be made or butadiene/acrylonitrile copolymer elastomers which in particular are functionalized. The functional groups are carried by the terminal chains and the functional groups which can be used are carboxyl (COOH), amine (NH or $NH_2$), vinyl methacrylate or epoxy groups. Use may thus be made of a functionalized polybutadiene, such as Hypro™ VTB 2000x168 (vinyl endings), alone or as a blend with a polychloroprene or a nonfunctionalized polybutadiene, such as Hypro™ CTB 2000x162 (carboxyl endings) (Emerald Performance Materials (EPM), Cuyahoga Falls, Ohio, USA). Use may also be made of Hypro™ VTBNX or CTBNX (butadiene/acrylonitrile copolymers) respectively having carboxyl and vinyl functional groups, and more particularly of Hypro™ VTBNX 1300x43 or 1300x33.

This elastomer is favorably present in an amount of between 4 and 30% by weight, preferably between 6 and 15% by weight and more preferably between 8 and 12% by weight, in the composition according to the invention. A smaller amount of elastomer is used when the composition comprises one or more block copolymers.

If the resin comprises one or more block copolymers, the relative proportions of the block copolymers:elastomer mixture are between 4:1 and 0.5:1 by weight in the composition, preferably approximately 2:1. However, it is also possible to have relative proportions of the order of approximately 0.5:1.

The composition according to the invention can also comprise elastomeric polymeric particles, known as core-shell particles, well known to a person skilled in the art (described in particular in U.S. Pat. No. 3,985,703, U.S. Pat. No. 4,304,709, U.S. Pat. No. 6,433,091, EP 1 256 615 or U.S. Pat. No. 6,869,497) and formed of a "hard" thermoplastic shell, preferably based on polymethyl methacrylate (PMMA), and of an elastomeric core, generally based on butadiene, often copolymerized with styrene, or based on acrylic.

Mention may in particular be made, in the implementation of the invention, of acrylonitrile/butadiene/styrene (ABS), methacrylate/butadiene/styrene (MBS), methacrylate/acrylonitrile/butadiene/styrene (MABS) or methacrylate/acrylonitrile polymers and the blends of these.

Preference is given in particular to impact-modifying particles, especially impact-modifying MBSs (MBS impact modifiers). In a preferred embodiment, these MBSs exhibit a low crosslinking of the polymer forming the core. Furthermore, these MBSs, in addition to their impact strength, also preferably exhibit a resistance to the cracking brought about by the impacts.

Thus, use is made in particular of the particles of Clearstrength C301, C303H, C223, C350, C351, E920 or C859 type or Durastrength D300 or P340 type from Arkema (Paris, France), the MBSs C301 and C303H being preferred. Use may also be made of the MBSs developed by Rohm and Haas (Philadelphia, Pa., United States), in particular Paraloid™ BTA 753.

These particles can be used alone or as a mixture. Thus, in a specific embodiment of the invention, use is made of a mixture of UPS particles (in particular C303H or C301) and of particles exhibiting a PUMA shell and an acrylonitrile core (in particular D340 particles).

Preferably, these particles are present in the composition in an amount of between 2 and 20% by weight, preferably between 5 and 15% by weight, of the composition.

The resin can also comprise an acid monomer, such as an acid monomer which can be polymerized by free radicals known in the art of the unsaturated carboxylic acid type, maleic acid, crotonic acid, isophthalic acid, fumaric acid and preferably methacrylic acid.

It is also possible to add isobornyl acrylate (IBXA), 2-hydroxyethyl methacrylate (HEMA), 2-hydroxypropyl methacrylate (HPMA), 2-(perfluorooctyl)ethyl acrylate (POA), tetrahydrofurfuryl acrylate (THFA) or isobutoxymethylacrylamide (IBMA). Mixtures of these compounds, in particular a mixture of HEMA and HPMA, can be added.

Preferably, the resin comprises methacrylic acid, acrylic acid and/or HEMA. Between 2 and 10% of each of these compounds, preferably between 3 and 7%, is added.

The resin according to the invention can also comprise at least one additional compound, such as a rheological agent, a polymerization accelerator or an adhesion promoter.

The rheological agent serves so guarantee a good viscosity of the composition according to the invention, in order for it to be able to be easily applied to the surfaces to be adhesively bonded. Use may be made of polyamides, such as Disparlon 6500 (Kusumoto Chemicals Ltd, Japan), or silica-based pulverulent elements or equivalents (untreated fumed silica or pyrogenic silica).

The polymerization accelerator serves to promote the polymerization and the curing of the adhesive when the catalyst is added. It is a tertiary amine, preferably an aromatic tertiary amine, such as dimethyl-para-toluidine, and/or 2,2'-(p-tolylimino)diethanol. Use may also be made of Leuco Crystal Violet (LCV).

The adhesion promoter is in particular a methacrylated phosphate ester, such as 2-hydroxyethyl methacrylate phosphate ester (Genorad 40 from Rahn AG, Zurich, Switzerland).

Other elements, such as inorganic fillers ($TiO_2$, $CaCO_3$, $Al_2O_3$ or zinc phosphate), agents which withstand ultraviolet radiation (such as 2-hydroxyphenyltriazine or Tinuvin 400 from Ciba-Geigy) or wax, can also be added to the resin. Small amounts of free-radical polymerization inhibitors, such as BHT, or benzoquinones, such as naphthoquinone, hydroquinone or ethylhydroquinone, can also be added to increase the lifetime of the resin.

The resin can also comprise silanes. The choice is made of silanes exhibiting vinyl, methacrylate/acrylate or amine functional groups (vinylsilanes, acryloyloxy-silanes or aminosilanes).

Resins which can be used in the context of the present invention and their applications are described in detail in applications WO 2008/080913 and WO 2008/125521.

The composition according to the invention is used with an acrylic resin in order to promote the adhesion of substrates to one another and is particularly advantageous when it is suitable for adhesively bonding a material to a composite material.

It is thus possible to carry out adhesive bondings of metals, plastics or composite materials to composite materials. The applications are thus in particular in the field of the construction of silos, wind turbines, boats or truck trailers. The systems described in the invention can also be used in the field of the motor vehicle industry or the railroad field.

Thus, the resin/composition according to the invention system makes possible the adhesion of one material to another material, one or another material being in particular a metal, a plastic, wood or a composite material. The composition can thus be used in one or other of the following applications: metal/metal adhesion, metal/composite adhesion, metal/plastic adhesion, metal/wood adhesion, wood/plastic adhesion, wood/composite adhesion, wood/wood adhesion, plastic/composite adhesion, plastic/plastic adhesion or composite/composite adhesion.

The systems according to the invention are used in particular to promote the adhesion of parts so composites obtained in closed molds, in particular on RTM (resin transfer molded) composites.

In order to improve the adhesive performances, these composites can be treated prior to the adhesion. This treatment consists of a sanding stage and/or a cleaning stage in order to remove the elements liable to oppose the polymerization and which are present at the surface of the composites, such as the RTM composites (in particular the mold-release agents). Cleaning can be carried out with isopropyl alcohol.

EXAMPLE

The tensile shear strength (SS) is measured according to a protocol deriving from standard. ISO 4587. In brief, test specimens of composite with dimensions of 100×25×1.6 mm (l×w×t) are used. Two test specimens are adhesively bonded to one another, the area of overlap being 25×12 mm (300 mm$^2$), with a thickness of the adhesive seal of approximately 200 to 400 μm. The force necessary to break the adhesion by pulling on the two test specimens is subsequently measured. Tearing of the contact surface of one of the two test specimens is looked for.

The elongation at break is observed according to a method described in particular by standard ISO 527, the drawing rate of the adhesive being constant and of 50 mm/min.

Two compositions comprising the free radical polymerization initiators are prepared.

Composition I:

| | |
|---|---|
| Epon 828 (liquid epoxide resin) | 22% |
| Plasticizing agent (diisobutyl phthalate) | 12% |
| Titanium oxide Millennium Chemicals | 23% |
| Defoamer (Byk 088) | 1% |
| Silica (Cab-O-Sil M5), thickening agent | 2% |
| 50% Benzoyl peroxide as paste | 40% |

Composition II:

| | |
|---|---|
| Epon 828 (liquid epoxide resin) | 20% |
| Epoxidized silane (Coatosil 1770) | 5% |
| Titanium oxide | 20% |
| Defoamer (Byk 088) | 1% |
| Silica (inert and Cab-O-Sil M5) | 14% |
| 50% Benzoyl peroxide as paste | 40% |

The benzoyl peroxide as paste used comprises approximately 50% of benzoyl peroxide, approximately 25% of plasticizing agent and approximately 25% of fillers, stabilizers and rheological agents.

The two compositions thus comprise approximately 20% of peroxide.

Composition I comprises approximately 22% of plasticizing agent, whereas composition II comprises only 10% of plasticizing agent (originating from the peroxide source).

The plasticizing agent has been replaced, in composition II, by inert fillers (silica) and by epoxidized silane.

These polymerization initiating agents are used with the resin:

| | | |
|---|---|---|
| Methyl methacrylate | AtoFinaElf | 42.3% |
| SIS copolymer | D1160, Kraton Polymers | 16% |
| SIBS copolymer | MD6455, Kraton Polymers | 5% |
| Elastomer | VTB, Hans Chemie | 7.5% |
| Acrylate ester monomer | 2EHA, AtoFinaElf | 4% |
| Acrylate ester monomer | HEMA, Cray Valley | 4% |
| Adhesion promoter | Genorad 40, Rahn | 2% |
| Acid monomer | MAA, AtoFinaElf | 4% |
| Polymerization accelerator | DMPT, PTE, Pergan | 1% |
| Elastomeric particles | C303H, Arkema | 10.7% |
| Rheological agent | Disparlon 6500, Kusumoto Chemicals | 2.5% |
| Other fillers | | 1.1% |

The resin and the polymerization initiating agent (composition I or composition II) are mixed in the ratio 10:1 (by volume), i.e. 10 parts of resin per one part of peroxide-based agent.

The shear strength SS and the elongation at break of the resin are measured.

The RTM test specimens are prepared by sanding with grain 80 and cleaning with isopropyl alcohol.

| | Composition I + Resin | Composition II + Resin |
|---|---|---|
| SS | 100% adhesive failure of the adhesive bonding surface at 1.1 MPa | 100% failure of the substrate of the adhesive bonding surface at 3.4 MPa |
| Elongation at break | 137.3% | 130.3% |

A better shear strength is thus observed when the catalytic composition comprises an epoxidized silane, while maintaining the elongation properties of the adhesive.

The invention claimed is:

1. A polymerization-catalyzing agent comprising between 5 and 40% by weight of a free radical polymerization initiating agent and between 1 and 30% by weight of an epoxidized silane, wherein the polymerization-catalyzing agent is capable of initiating polymerization of a resin comprising monomers upon mixture with the resin.

2. The catalyzing agent as claimed in claim 1, characterized in that it does not comprise a plasticizing agent or in that it comprises at most 20% (by weight) of plasticizing agent.

3. The catalyzing agent as claimed in claim 1, characterized in that the free radical polymerization initiating agent is a peroxide.

4. The catalyzing agent as claimed in claim 3, characterized in that said peroxide is benzoyl peroxide.

5. The catalyzing agent as claimed in claim 1, characterized in that it comprises between 10 and 20% by weight of polymerization initiating agent.

6. The catalyzing agent as claimed in claim 1, characterized in that it additionally comprises an epoxide resin.

7. The catalyzing agent as claimed in claim 1, characterized in that it additionally comprises inorganic fillers.

8. A method for initiating the polymerization of a (meth) acrylic resin comprising mixing the catalyzing agent of claim 1 with a (meth)acrylic resin.

9. The method of claim 8, wherein said catalyzing agent is mixed with said resin in a ratio of 1:1 to 1:30 (by volume) with respect to said resin.

10. The method of claim 9, wherein said catalyzing agent is mixed with said resin in a ratio of 1:10 (one part of catalyzing agent per 10 parts of resin).

11. The method of claim 8, wherein said resin additionally comprises at least one other element chosen from an elastomeric block copolymer comprising styrene and isoprene, an elastomeric block copolymer comprising styrene and butadiene or ethylene, an elastomer, an acrylate ester monomer in which the alcohol part exhibits at least one linear chain of at least 6 carbon atoms, a polymerization accelerator, a rheological agent, an adhesion promoter, an acid monomer, particles formed of a thermoplastic shell and of an elastomeric core (acrylonitrile/butadiene/styrene, methacrylate/butadiene/styrene, methacrylate/acrylonitrile/butadiene/styrene or methacrylate/acrylonitrile particles and the mixtures of these).

12. A method for promoting the adhesion of parts to a composite material comprising adhering a part to a composite material with the catalyzing agent of claim 1.

13. A two-component structural adhesive comprising
a) a resin comprising monomers, which polymerize upon addition of a polymerization-catalyzing agent; and
b) a polymerization-catalyzing agent, wherein said polymerization-catalyzing agent comprises between 5 and 40% by weight of a free radical polymerization initiating agent and between 1 and 30% by weight of an epoxidized silane.

14. The two-component structural adhesive of claim 13, wherein said polymerization-catalyzing agent additionally comprises an epoxide resin.

15. The two-component structural adhesive of claim 13, wherein said polymerization-catalyzing agent comprises between 10 and 20% by weight of polymerization initiating agent.

16. The two-component structural adhesive of claim 13, wherein said polymerization-catalyzing agent does not comprise a plasticizing agent or comprises at most 20% (by weight) of plasticizing agent.

17. The two-component structural adhesive of claim 13, wherein said resin is a (meth)acrylic resin.

18. The two-component structural adhesive of claim 13, wherein said resin additionally comprises at least one other element selected from the group consisting of an elastomeric block copolymer comprising styrene and isoprene, an elastomeric block copolymer comprising styrene and butadiene or ethylene, an elastomer, an acrylate ester monomer in which the alcohol part exhibits at least one linear chain of at least 6 carbon atoms, a polymerization accelerator, a rheological agent, an adhesion promoter, an acid monomer, and particles formed of a thermoplastic shell and of an elastomeric core (acrylonitrile/butadiene/styrene, methacrylate/butadiene/styrene, methacrylate/acrylonitrile/butadiene/styrene or methacrylate/acrylonitrile particles and the mixtures of these).

19. A cartridge comprising a compartment containing a polymerizable resin and another compartment containing polymerization-catalyzing agent comprising between 5 and 40% by weight of a free radical polymerization initiating agent and between 1 and 30% by weight of an epoxidized silane.

20. The cartridge of claim 19, wherein said resin is a (meth)acrylic resin, which optionally comprises at least one other element selected from the group consisting of an elastomeric block copolymer comprising styrene and isoprene, an elastomeric block copolymer comprising styrene and butadiene or ethylene, an elastomer, an acrylate ester monomer in which the alcohol part exhibits at least one linear chain of at least 6 carbon atoms, a polymerization accelerator, a rheological agent, an adhesion promoter, an acid monomer, and particles formed of a thermoplastic shell and of an elastomeric core (acrylonitrile/butadiene/styrene, methacrylate/butadiene/styrene, methacrylate/acrylonitrile/butadiene/styrene or methacrylate/acrylonitrile particles and the mixtures of these).

21. The catalyzing agent of claim 1, which contains between 5 and 20% by weight of epoxidized silane.

22. The two-component structural adhesive of claim 13, wherein the monomers are (meth)acrylate monomers.

23. The two-component structural adhesive of claim 13, wherein the resin comprises an acid monomer.

24. The two-component structural adhesive of claim 23, wherein the acid monomer present in the resin is selected from the group consisting of maleic acid, crotonic acid, isophthalic acid, fumaric acid, and methacrylic acid.

25. The two-component structural adhesive of claim 13, wherein the resin comprises an adhesion promoter, wherein the adhesion promoter is a methacrylated phosphate ester.

26. The two-component structural adhesive of claim 25, wherein the adhesion promoter is 2-hydroxyethyl methacrylate phosphate ester.

* * * * *